United States Patent
Ke et al.

(10) Patent No.: US 11,490,383 B2
(45) Date of Patent: Nov. 1, 2022

(54) INFORMATION TRANSMISSION METHOD, BASE STATION AND NETWORK MANAGEMENT UNIT

(71) Applicants: China Mobile Communication Co., Ltd Research Institute, Beijing (CN); China Mobile Communications Group Co., Ltd., Beijing (CN)

(72) Inventors: Ting Ke, Beijing (CN); Liang Xia, Beijing (CN); Hua Shao, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 138 days.

(21) Appl. No.: 16/959,744

(22) PCT Filed: Dec. 7, 2018

(86) PCT No.: PCT/CN2018/119775
§ 371 (c)(1),
(2) Date: Jul. 2, 2020

(87) PCT Pub. No.: WO2019/134479
PCT Pub. Date: Jul. 11, 2019

(65) Prior Publication Data
US 2020/0374874 A1 Nov. 26, 2020

(30) Foreign Application Priority Data
Jan. 5, 2018 (CN) .......................... 201810009346.6

(51) Int. Cl.
*H04J 3/00* (2006.01)
*H04W 72/04* (2009.01)
*H04L 5/00* (2006.01)

(52) U.S. Cl.
CPC ....... *H04W 72/0446* (2013.01); *H04L 5/0048* (2013.01)

(58) Field of Classification Search
CPC .................. H04W 72/0446; H04L 5/0048
(Continued)

(56) References Cited

U.S. PATENT DOCUMENTS

| 2014/0086089 A1* | 3/2014 | Huang | H04W 24/08 370/252 |
| 2014/0177486 A1* | 6/2014 | Wang | H04L 5/0053 370/280 |

(Continued)

FOREIGN PATENT DOCUMENTS

| CN | 103037498 A | 4/2013 |
| CN | 103516468 A | 1/2014 |

(Continued)

OTHER PUBLICATIONS

Samsung (R1-131009, "DL subframe set based mechanism to support TDD UL-DL reconfiguration", Apr. 15-Apr. 19, 2013, (Year: 2013).*

*Primary Examiner* — Maharishi V Khirodhar
(74) *Attorney, Agent, or Firm* — Price Heneveld LLP

(57) ABSTRACT

An information transmission method, a base station and a network management entity are provided. The information transmission method includes: transmitting and/or receiving, by the base station, a reference signal in accordance with a configuration of reference frame structure, and/or determining, by the base station, an uplink and/or downlink time-domain transmission resource configuration in accordance with the configuration of reference frame structure. The uplink and/or downlink time-domain transmission resource configuration is used when the base station communicates with a UE served by the base station, and the configuration of reference frame structure includes a period (Continued)

of a reference frame, and at least one of a first reference point and a second reference point in the period of the reference frame.

16 Claims, 6 Drawing Sheets

(58) Field of Classification Search
USPC .......................................................... 370/336
See application file for complete search history.

(56) References Cited

U.S. PATENT DOCUMENTS

| 2014/0219113 | A1* | 8/2014 | Li | H04B 17/345 370/252 |
|---|---|---|---|---|
| 2014/0226640 | A1 | 8/2014 | Zhu et al. | |
| 2017/0311350 | A1 | 10/2017 | Chatterjee et al. | |

FOREIGN PATENT DOCUMENTS

| CN | 104244261 A | 12/2014 | | |
|---|---|---|---|---|
| WO | WO-2011120231 A1 * | 10/2011 | ......... | H04L 27/2613 |

\* cited by examiner

INFORMATION TRANSMISSION METHOD, BASE STATION AND NETWORK MANAGEMENT UNIT

CROSS-REFERENCE TO RELATED APPLICATION

The present application is the U.S. national phase of PCT Application No. PCT/CN2018/119775 filed on Dec. 7, 2018, which claims a priority of the Chinese patent application No. 201810009346.6 filed in China on Jan. 5, 2018, which are incorporated herein by reference in their entireties.

TECHNICAL FIELD

The present disclosure relates to the field of communication technology, in particular to an information transmission method, a base station and a network management entity.

BACKGROUND

Impact caused by a remote interference phenomenon (the interference comes from a far away base station) is very wide (several hundreds of kilometers), and probably base stations in many cities, provinces or states may be involved. Base station devices from different manufacturers are adopted by different cities, provinces or even countries, and when no standardized remote interference management mechanism is provided, it is very difficult for different manufacturers to work collaboratively.

To solve the above problem, a remote base station interference management process on the basis of wide-area Self-Organizing Network (SON) management is shown in FIG. 1: 1. a base station V detects the remote interference phenomenon, where the interference comes from a far away base station; 2. the base station V reports a potential interference to a wide-area SON; 3. the wide-area SON notifies the base station V to transmit an interference detection Reference Signal (RS) 1; 4. the wide-area SON notifies a base station A to monitor the RS 1; 5. the base station V transmits the RS 1 repeatedly; 6. the base station A detects the RS 1 repeatedly; 7. the base station A reports an interference detection result to the wide-area SON; 8. the wide-area SON configures an interference fallback mechanism for the base station A; 9. the base station A performs an interference fallback operation.

Especially, in a homogeneous network (where a same frame structure configuration is adopted by all the base stations), the base station may simply determine Orthogonal Frequency Division Multiplexing (OFDM) symbols on which a dedicated reference signal for detecting the remote base station interference is transmitted (corresponding to Step 5) or received (corresponding to Step 6).

As shown in FIG. 2, when a certain base station is used to transmit a first RS, the base station determines that the RS is to be transmitted using, in a forward mode, at least two downlink OFDM symbols just before a Guard Period (GP), i.e., starting from a first downlink OFDM symbol before the GP, and at least including the first downlink OFDM symbol before a GP.

When a certain Transmission-Reception Point (TRP) is used to receive the first RS, the TRP determines that the RS is to be monitored using, in a backward mode, at least one uplink OFDM symbol just after the GP, i.e., starting from a first uplink OFDM symbol after the GP, and at least including the first uplink OFDM symbol after the GP. The RS is used to detect the remote interference phenomenon, wherein the interference comes from a far away base station.

The homogeneous network is capable of operating normally through the remote base station interference management process in FIG. 1 in conjunction with positions of resources for transmitting and receiving the RS for detecting the remote base station interference in a time domain in FIG. 2.

FIG. 3 is a topological structural view of a TRP 1 of a first base station and a TRP 2 of a second base station. FIG. 4 is a schematic view showing an interference characteristic in a data domain, where Downlink (DL) data for one of the TRP 1 and the TRP 2 interferes with Uplink (UL) data for the other one of the TRP 1 and the TRP 2.

As shown in FIGS. 3 and 4, the TRP 1 and the TRP 2 are spaced apart from each other by about 3.5 OFDM Symbols (OSs), have a totally same frame structure configuration (i.e., the TRP 1 and the TRP 2 have a totally same configuration of DL, GP and UL within a same period), and keep synchronization with each other in time domain.

Due to a special atmospheric propagation environment, a signal transmitted by the TRP 1 (or the TRP 2) on some downlink OFDM symbols may reach, at a certain reception power level, some uplink OFDM symbols for the other one of the TRP 2 (or the TRP 1) as a strong interference signal, so the UL data transmission performance of the other one of the TRP 2 (or the TRP 1) may be adversely affected.

For example, in FIG. 4, on about 1.5 uplink OFDM symbols after the GP, the TRP 1 (or the TRP 2) is disturbed by a DL signal from the other one of the TRP 2 (or the TRP 1).

Each of the TRP 1 and the TRP 2 determines that the interference probably comes from a remote base station through detecting a statistical rule of an interference signal, and report it to the wide-area SON, so as to trigger the remote base station interference management procedure on the basis of the wide-area SON management as shown in FIG. 1.

FIG. 5 shows the remote base station interference management procedure triggered by the TRP 1 (including Steps 1, 2, 3, 4, 5, 6 and 7). The RS is transmitted by the TRP 1 on last two DL OFDM symbols before the GP. The RS is monitored by the TRP 2 on some UL OFDM symbols after the GP, and then a monitoring result is reported, i.e., for this case, an interference-affected zone is one OFDM symbol.

FIG. 6 shows the interference fallback and its effect (including Steps 8 and 9). The TRP 2 is configured by the wide-area SON to fall back by two DL OFDM symbols, so as to eliminate the remote interference caused by the TRP 2 on the TRP 1.

It is found that, the remote base station interference management procedure on the basis of the wide-area SON management is triggered by each of the TRP 1 and the TRP 2 independently. FIGS. 5 and 6 merely shows relevant processings after the remote base station interference management procedure on the basis of the wide-area SON management has been triggered by the TRP 1, as well as effects thereof. Through the process, the TRP 2 is configured by the wide-area SON to perform DL fallback, so as to eliminate the remote interference caused by the TRP 2 on the TRP 1.

As shown in FIG. 6, after the remote base station interference management procedure on the basis of the wide-area SON management has been triggered by the TRP 1, it is able to eliminate the remote interference caused by the TRP 2 on the TRP 1. However, the remote interference is still caused by the TRP 1 on the TRP 2. Hence, as a reasonable operation, similar to that shown in FIGS. 5 and 6, the remote base station interference management procedure on the basis of the wide-area SON management is also triggered by the TRP 2, so as to eliminate the remote interference caused by the TRP 1 on the TRP 2. Based on the above operations, it is able for one of the TRP 1 and the TRP 2 to eliminate the remote interference caused by the other one of the TRP 1 and the TRP 2.

Specifically, FIGS. 5 and 6 further show operational details in the remote base station interference management procedure on the basis of the wide-area SON management, which includes the following steps.

Step 1: the TRP 1 (i.e., the base station V in the flowchart, where V represents "victim") determines that the interference probably comes from a remote base station through detecting a statistical rule of an interference signal.

Step 2: the TRP 1 reports interference information to the wide-area SON, so as to trigger the remote base station interference management procedure on the basis of the wide-area SON management.

Step 3: the wide-area SON notifies the TRP 1 to transmit a dedicated reference signal for detecting the remote base station interference, i.e., the first RS, on last two DL OFDM symbols before the GP.

Step 4: the wide-area SON notifies at least one potential aggressing base station including the TRP 2 (i.e., the base station A in the flowchart, where A represents "aggressor") to monitor the first RS on some UL OFDM symbols after the GP.

Step 5: the TRP 1 transmits the first RS in accordance with a configuration from the wide-area SON.

Step 6: the TRP 2 monitors the first RS in accordance with a configuration from the wide-area SON, and detect the first RS in {k, k+1, . . . }-th UL OFDM symbol after the GP, where k-th is the first UL OFDM symbol where the first RS is detected after the GP.

Step 7: the TRP 2 reports a monitoring result, including a maximum influence range (e.g., one OS), to the wide-area SON.

Step 8: the wide-area SON configures the TRP 2 to perform an interference fallback operation, so as to enable the TRP 2 to fall back at least two DL OFDM symbols.

Step 9: the TRP 2 performs an interference fallback operation of two DL OFDM symbols in accordance with a configuration from the wide-area SON, so as to eliminate the remote interference caused by the TRP 2 on the TRP 1.

In the case of the positions of the resources for transmitting and receiving the RS for detecting the remote base station interference in the time domain in FIG. 2, the homogeneous network (where the same frame structure configuration is adopted by all the base stations) is capable of operating normally, but a heterogeneous network (where different frame structure configurations are adopted by some base stations) is incapable of operating normally and needs to be enhanced.

Examples of the failure of the remote base station interference management mechanism will be described hereinafter in two typical heterogeneous network types.

Firstly, it should be appreciated that, in a $5^{th}$-Generation (5G) New Radio (NR) system, a base station wants to dynamically adjust its frame structure configuration (i.e., dynamically adjust a ratio of uplink subframes to downlink subframes within a certain time period), so as to be adapted to dynamically-changed service characteristics.

FIG. 7 shows a possible semi-static frame structure configuration to be adopted by the 5G NR system. Within a predetermined frame structure period T, it is determined that, some time-domain resources in the beginning are fixedly used for downlink transmission, some time-domain resources in the end are fixedly used for uplink transmission, and the remaining time-domain resources in the middle may be flexibly used for downlink or uplink transmission or even not used for data transmission.

Due to the existence of the semi-static frame structure configuration, the heterogeneous network should be a typical network feature in the 5G NR system.

Examples of the failure of the remote base station interference management mechanism will be described hereinafter in two typical heterogeneous network types.

FIG. 8 shows a heterogeneous network type 1, with aligned DLs and different GP lengths, resulting in unaligned ULs.

As shown in FIG. 8, the DL of the TRP 1 is aligned with the DL of the TRP 2, the length of the GP of the TRP 1 is different from the length of the GP of the TRP 2, so the ULs of the TRP 1 are not aligned with the ULs of the TRP 2.

In Step 1 of FIG. 8, the TRP 1 detects that there is the remote interference (corresponding to Step 1 in the flowchart).

In Step 2 of FIG. 8, the TRP 1 transmits the RS for detecting the remote base station interference (i.e., the first RS) on two DL OFDM symbols before the GP in accordance with its own frame structure configuration (corresponding to Step 5 in the flowchart), and the TRP 2 monitors the first RS on at least one UL OFDM symbol after the GP in accordance with its own frame structure configuration (corresponding to Step 6 in the flowchart). In the case of the heterogeneous network, the GP of the TRP 2 is longer than that of the TRP 1, so it is impossible for the TRP 2 to successfully monitor the first RS transmitted from the TRP 1. At this time, the TRP 2 may not trigger the subsequent interference fallback operation, so the remote interference management mechanism fails.

FIG. 9 shows a heterogeneous network type 2, with aligned ULs and different GP lengths, resulting in unaligned DLs.

As shown in FIG. 9, the UL of the TRP 1 is aligned with the UL of the TRP 2, and the length of the GP of the TRP 1 is different from the length of the GP of the TRP 2, so the DL of the TRP 1 is not aligned with the DL of the TRP 2.

In Step 1 of FIG. 9, the TRP 2 detects that there is the remote interference (corresponding to Step 1 in the flowchart).

In Step 2 of FIG. 9, the TRP 2 transmits the RS for detecting the remote base station interference (i.e., the first RS) on two DL OFDM symbols before the GP in accordance with its own frame structure configuration (corresponding to Step 5 in the flowchart), and the TRP 1 monitors the first RS on at least one UL OFDM symbol after the GP in accordance with its own frame structure configuration (corresponding to Step 6 in the flowchart). In the case of the heterogeneous network, the number of DL OFDM symbols for the TRP 2 is less than the number of DL OFDM symbols for the TRP 1, so it is impossible for the TRP 1 to successfully monitor the first RS transmitted from the TRP 2. At this time, the TRP 1 may not trigger the subsequent interference fallback operation, so the remote interference management mechanism fails.

SUMMARY

An object of the present disclosure is to provide an information transmission method, a base station and a network management entity, it defines a reference frame structure configuration independent of a real frame structure configuration for each base station, so as to enable each base station to transmit or receive a reference signal for detecting a remote base station interference according to the reference frame structure configuration, thereby to effectively prevent the remote base station interference management procedure from being adversely affected by the heterogenization of the base stations.

In one aspect, the present disclosure provides in some embodiments an information transmission method for a base station, including: transmitting and/or receiving, by the base station, a reference signal in accordance with a configuration of reference frame structure, and/or determining, by the base station, an uplink and/or downlink time-domain transmission resource configuration in accordance with the configuration of reference frame structure. The uplink and/or downlink time-domain transmission resource configuration is used when the base station communicates with a User Equipment (UE) served by the base station, and the configuration of reference frame structure includes a period of a reference frame, and at least one of a first reference point and a second reference point in the period of the reference frame.

In a possible embodiment of the present disclosure, the reference signal is used to detect a remote interference phenomenon, where the interference comes from a far away base station.

In a possible embodiment of the present disclosure, when the period of the reference frame is equal to a period of a semi-static frame structure, a time-domain position of the first reference point is less than or equal to a left boundary of a fixed uplink transmission resource in the semi-static frame structure.

In a possible embodiment of the present disclosure, the configuration of reference frame structure is determined by the base station in accordance with at least one method of a predefined rule, network management configuration, and inter-base station signaling indication.

In a possible embodiment of the present disclosure, when the configuration of reference frame structure is determined by the base station in accordance with at least one method of the inter-base station signaling indication and the network management configuration, the base station receives at least one of: first indication information for determining the period of the reference frame; second indication information for determining the first reference point, wherein the second indication information includes a first duration, and a time distance from the first reference point to a predefined boundary of the period of the reference frame is equal to the first duration; and third indication information for determining the second reference point, wherein the third indication information includes a second duration, a time distance from the second reference point to the first reference point is equal to the second duration, and a time corresponding to the second reference point is not later than a time corresponding to the first reference point in the period of the reference frame.

In a possible embodiment of the present disclosure, when the configuration of reference frame structure is determined by the base station in accordance with at least one method of the inter-base station signaling indication and the network management configuration, the base station receives at least one of: fourth indication information, wherein the fourth indication information includes a first transmission switching period and an indication for a first upper limit of downlink transmission resources in the first transmission switching period, wherein the configuration of reference frame structure is determined by the base station in accordance with the fourth indication information through at least one of: determining, by the base station, the period of the reference frame in accordance with the first transmission switching period; and determining, by the base station, the second reference point in accordance with the first upper limit.

In a possible embodiment of the present disclosure, the configuration of reference frame structure is determined through at least one of: determining, by the base station, that the period of the reference frame is equal to the first transmission switching period; determining, by the base station, a maximum available downlink transmission resource set in the first transmission switching period in accordance with the first upper limit; and determining, by the base station, that a start time point of the second reference point is equal to an end time point of the last downlink transmission resource in the maximum available downlink transmission resource set.

In a possible embodiment of the present disclosure, when the base station determines the downlink time-domain transmission resource configuration used when the base station communicates with the UE served by the base station in accordance with the configuration of reference frame structure, an end time point of the downlink time-domain transmission resource is not later than the second reference point.

In a possible embodiment of the present disclosure, when a first interference event has been detected by the base station on an uplink OFDM symbol within a time interval from the first reference point to a right boundary of the period of the reference frame, at least one of the following procedures is performed by the base station: transmitting, by the base station, a first signaling to the network management entity to report the first interference event; or transmitting, by the base station, a first reference signal.

In a possible embodiment of the present disclosure, the base station is periodically monitoring the first interference event.

In a possible embodiment of the present disclosure, the first signaling includes at least one of: an identifier of the base station, a maximum interference intensity, a maximum interference intensity offset, a maximum interference level, a third duration and at least one type of fourth duration.

In a possible embodiment of the present disclosure, the maximum interference intensity=the maximum interference intensity offset+a reference value for maximum interference intensity; the third duration is a maximum value of a distance from each of detection points to the first reference point, where at each detection point, the respective detected interference intensity value is greater than a first threshold; and the at least one fourth duration is a maximum value of a distance from each of detection point to the first reference point, where at each detection point, the respective detected interference intensity value is greater than at least one second threshold.

In a possible embodiment of the present disclosure, when the first signaling includes the maximum interference intensity, the base station determines a unit of the maximum interference intensity in accordance with at least one method of the predefined rule, the network management configuration, and the inter-base station signaling indication; or when the first signaling includes the maximum interference intensity offset, the base station determines the reference value for maximum interference intensity and a unit of the maximum interference intensity offset in accordance with at least one method of the predefined rule, the network management configuration, and the inter-base station signaling indication;

or when the first signaling includes the maximum interference level, the base station determines an interference level set consisting of at least one interference level in accordance with at least one method of the predefined rule, the network management configuration, and the inter-base station signaling indication; or when the first signaling includes the third duration, the base station determines the first threshold and a unit of the third duration in accordance with at least one method of the predefined rule, the network management configuration, and the inter-base station signaling indication; or when the first signaling includes at least one type of fourth duration, the base station determines the at least one second threshold and a unit of the fourth duration in accordance with at least one method of the predefined rule, the network management configuration, and the inter-base station signaling indication.

In a possible embodiment of the present disclosure, the first reference signal is transmitted by the base station within a time interval [the second reference point–a fifth duration, the second reference point], and the fifth duration is a time-domain length of the first reference signal.

In a possible embodiment of the present disclosure, prior to transmitting, by the base station, the first reference signal, the information transmission method further includes receiving, by the base station, an indication from the network management entity, and determining, by the base station, that the first reference signal is to be transmitted.

In a possible embodiment of the present disclosure, prior to determining, by the base station, that the first reference signal is to be transmitted, the information transmission method further includes adjusting, by the base station as the base station needs, the uplink and/or downlink time-domain transmission resource configuration adopted when the base station communicates with the UE served by the base station, to at least ensure that a time-domain transmission resource for transmitting the first reference signal is not used to receive uplink data of the UE served by the base station.

In a possible embodiment of the present disclosure, the base station determines the fifth duration through the predefined rule; or the base station receives fifth indication information, and determines the fifth duration, wherein the fifth indication information is carried in at least one indication method of the inter-base station signaling indication and the network management configuration.

In a possible embodiment of the present disclosure, the first reference signal is monitored by the base station starting from the first reference point.

In a possible embodiment of the present disclosure, the first reference signal is monitored by the base station within a sixth duration starting from the first reference point.

In a possible embodiment of the present disclosure, the base station determines the sixth duration in accordance with the predefined rule; or the base station receives sixth indication information, and determines the sixth duration, wherein the sixth indication information is carried in at least one indication method of the inter-base station signaling and the network management configuration.

In a possible embodiment of the present disclosure, the first reference signal is monitored by the base station within a consecutive or nonconsecutive monitoring window consisting of a period of at least one reference frame in accordance with an indication from the network management entity; or the first reference signal is monitored by the base station repeatedly in accordance with a predetermined period configuration.

In another aspect, the present disclosure provides in some embodiments an information transmission method for a network management entity, including configuring a reference frame structure for at least one first base station and/or second base station. The configuration of reference frame structure includes a period of a reference frame, and at least one of a first reference point and a second reference point in the period of the reference frame.

In a possible embodiment of the present disclosure, the information transmission method further includes: receiving a first interference event reported by the at least one first base station; transmitting, to the at least one first base station, indication information for indicating the first base station to transmit a first reference signal.

In a possible embodiment of the present disclosure, the information transmission method further includes: transmitting, to the at least one second base station, indication information for indicating the second base station to monitor the first reference signal, to enable the second base station to monitor the first reference signal within a consecutive or non-consecutive monitoring window consisting of a period of at least one reference frame, or enable the second base station to monitor the first reference signal repeatedly in accordance with a predetermined period configuration.

In a possible embodiment of the present disclosure, when the period of the reference frame is equal to a period of a semi-static frame structure, a time-domain position of the first reference point is configured to be less than or equal to a left boundary of a fixed uplink transmission resource in the semi-static frame structure.

In a possible embodiment of the present disclosure, when configuring the first reference point and the second reference point, a time interval t3 from the second reference point to the first reference point is determined through that: the time interval t3 from the second reference point to the first reference point is at least greater than or equal to t1, wherein t1 represents a minimum switching time from a downlink transmission resource to an uplink transmission resource for all base stations in a network; or the time interval t3 from the second reference point to the first reference point is at least greater than or equal to t2, wherein t2 represents a minimum GP duration for all the base stations in the network.

In yet another aspect, the present disclosure provides in some embodiments a base station, including a transceiver used to transmit and/or receive a reference signal in accordance with a configuration of reference frame structure, and/or determine an uplink and/or downlink time-domain transmission resource configuration in accordance with the configuration of reference frame structure, wherein the uplink and/or downlink time-domain transmission resource configuration is used when the base station communicates with a UE served by the base station, and the configuration of reference frame structure includes a period of a reference frame, and at least one of a first reference point and a second reference point in the period of the reference frame.

In still yet another aspect, the present disclosure provides in some embodiments a network management entity, including a processor used to configure a reference frame structure for at least one first base station and/or second base station, wherein the configuration of reference frame structure includes a period of a reference frame, and at least one of a first reference point and a second reference point in the period of the reference frame.

In still yet another aspect, the present disclosure provides in some embodiments a communication device, including a processor, and a memory storing therein a computer program. The processor is used to execute the computer program, so as to implement the above-mentioned methods.

In still yet another aspect, the present disclosure provides in some embodiments a computer-readable storage medium storing therein an instruction. The instruction is used to be executed by a computer so as to implement the above-mentioned methods.

The present disclosure at least has the following beneficial effects. According to the embodiments of the present disclosure, the base station may transmit or receive, the reference signal, and/or determine the uplink and/or downlink time-domain transmission resource configuration used when the base station communicates with the UE served by the base station in accordance with the configuration of reference frame structure. The configuration of reference frame structure may include the period of the reference frame, and at least one of the first reference point and the second reference point in the period of the reference frame. In the case of transmitting and receiving the reference signal for detecting the remote base station interference, it is able to homogenize a heterogeneous network. Through defining the reference frame structure independent of a real frame structure for each base station, it is able for each base station to transmit/receive the reference signal for detecting the remote base station interference according to the reference frame structure configuration, thereby to effectively prevent the remote base station interference management process from being adversely affected by the heterogenization of the base stations.

DETAILED DESCRIPTION

Figure 1:
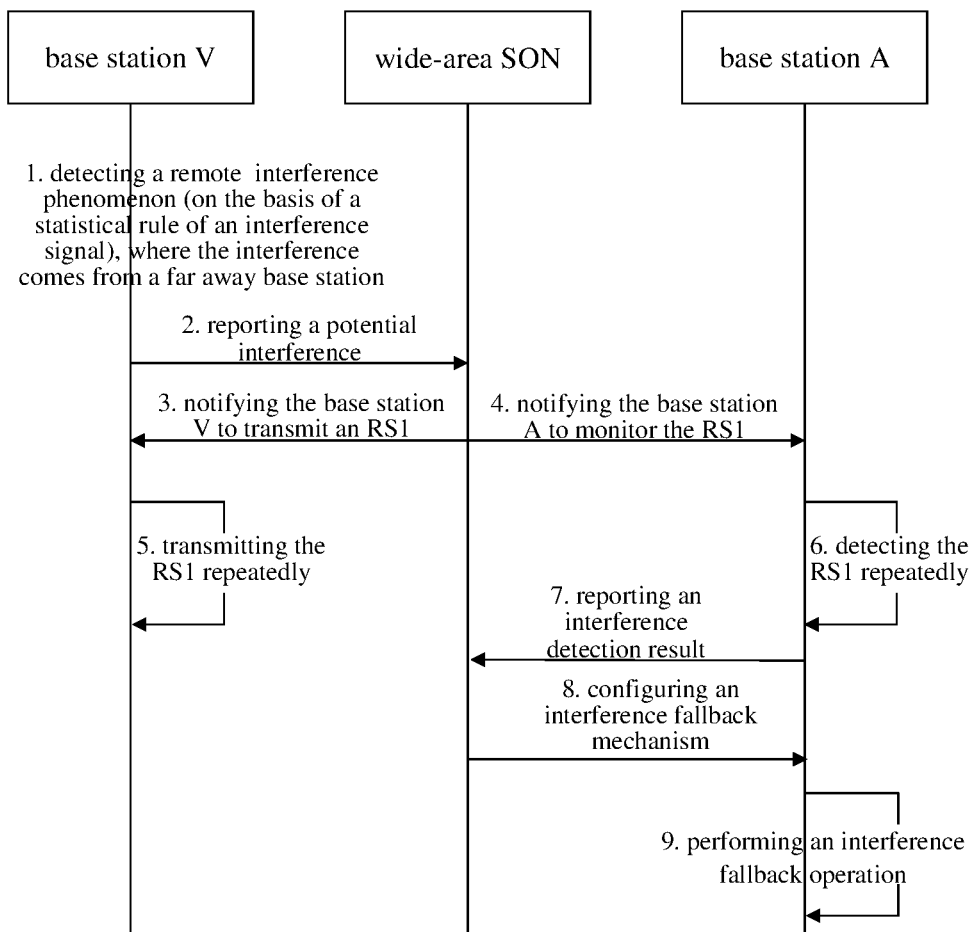
FIG. 1 is a schematic view showing a remote base station interference management process.
Figure 2:
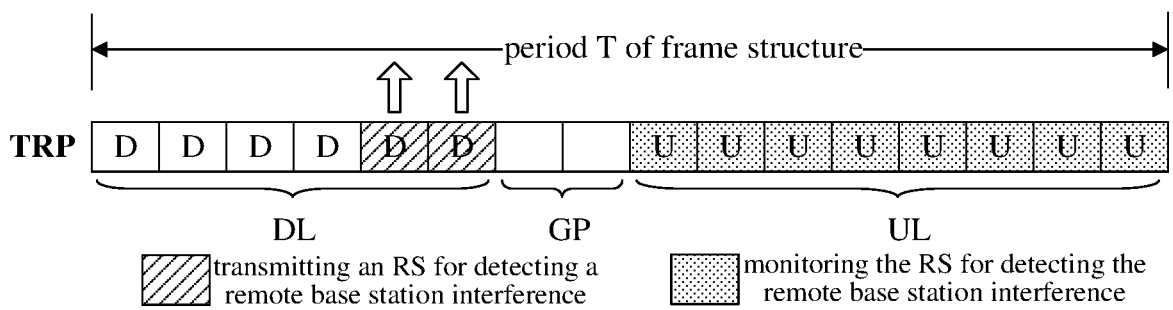
FIG. 2 is a schematic view showing time-domain resource positions for transmitting and receiving an RS for detecting the remote base station interference in a homogeneous network.
Figure 3:
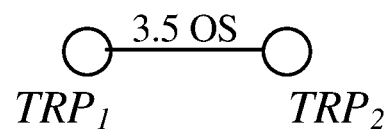
FIG. 3 is a schematic view showing a topological structural view of base stations in the homogeneous network.
Figure 4:
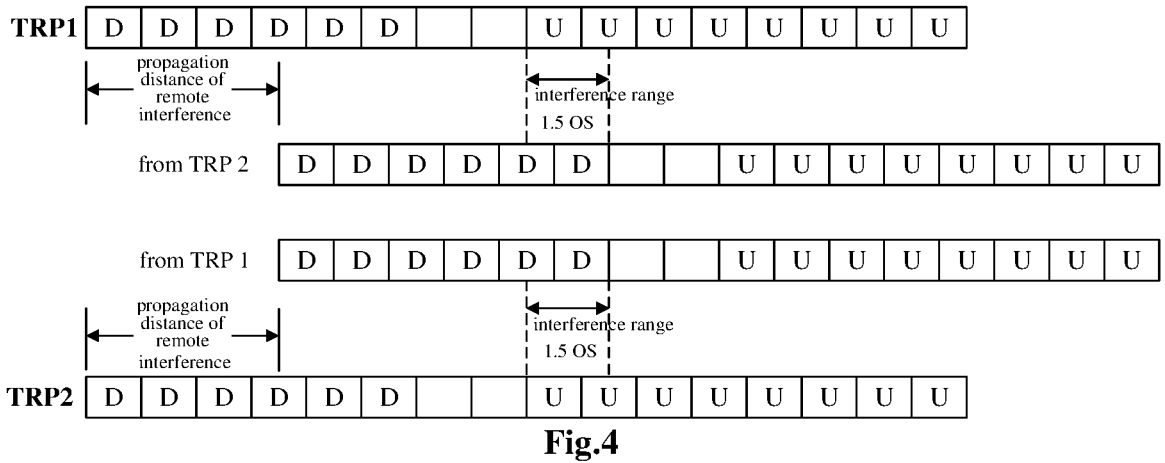
FIG. 4 is a schematic view showing the interference caused by DL data for any one of a TRP 1 and a TRP 2 on UL data for the other of the TRP 1 and the TRP 2 in the homogeneous network.
Figure 5:
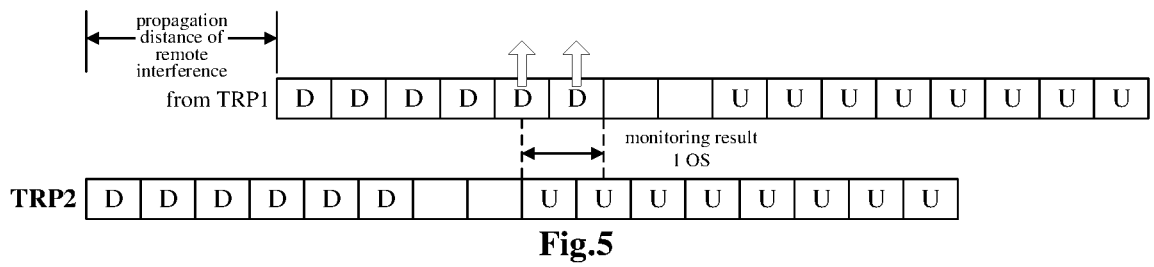
FIG. 5 is a schematic view showing a situation where the remote base station interference management process is trigged by the TRP 1 in the homogeneous network.
Figure 6:
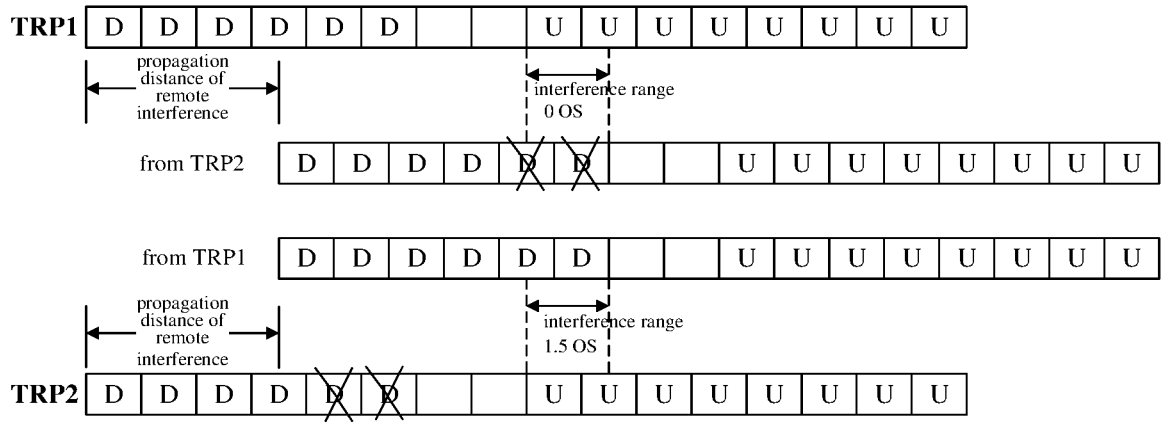
FIG. 6 is a schematic view showing an effect when the TRP 2 configured by a wide-area SON falls back by two DLs in the homogeneous network.

The present disclosure will be described in more details hereinafter in conjunction with the drawings and embodiments. It should be appreciated that, although the exemplary embodiments of the present disclosure are shown in the drawings, it should be understood that the present disclosure can be implemented in various forms and should not be limited by the embodiments set forth herein. Rather, these embodiments are provided to enable a more thorough understanding of the present disclosure and to fully convey the scope of the present disclosure to a person skilled in the art.

The present disclosure provides in some embodiments an information transmission method for a base station, which includes transmitting and/or receiving, by the base station, a reference signal in accordance with a configuration of reference frame structure, and/or determining, by the base station, an uplink and/or downlink time-domain transmission resource configuration in accordance with the configuration of reference frame structure. The uplink and/or downlink time-domain transmission resource configuration is used when the base station communicates with a UE served by the base station, and the configuration of reference frame structure includes a period of a reference frame, and at least one of a first reference point and a second reference point in the period of the reference frame.

According to the embodiments of the present disclosure, through defining the reference frame structure configuration independent of a real frame structure configuration for each base station, it is able for each base station to transmit/receive the reference signal for detecting the remote base station interference according to the reference frame structure configuration, thereby to effectively prevent the remote base station interference management procedure from being adversely affected by the heterogenization of the base stations.

In a possible embodiment of the present disclosure, the base station may determine the configuration of reference frame structure in accordance with at least one of a predefined rule, a network management entity Operation Administration and Maintenance (OAM) configuration and inter-base station configuration signaling (backhaul signaling). Here, some base stations may be managed through the network management entity.

Here, the predefined rule may be predefined in a standard specification.

Here, the OAM configuration may refer to a static configuration through the network management entity.

Here, the configuration through the inter-base station backhaul signaling may refer to that, when there is a global or local network management entity in a network, the network management entity may semi-statically control (coordinate and/or adjust) behaviors of parts of or all of the base stations in the network. The network management entity may be a physical entity or only a virtual entity, and the network management entity may be called as SON, wide-area SON or big data processing center. Parameters of the base station, such as a first period, the first reference point and the second reference point, may be configured by the network management entity through the inter-base station backhaul signaling.

In a possible embodiment of the present disclosure, when the configuration of reference frame structure is determined by the base station in accordance with at least one of the network management configuration and the inter-base station signaling indication, the base station may receive at least one of: first indication information for determining the period of the reference frame; second indication information for determining the first reference point and including a first duration, a time distance from the first reference point to a predefined boundary of the period of the reference frame being equal to the first duration; and third indication information for determining the second reference point and including a second duration, a time distance from the second reference point to the first reference point being equal to the second duration, a time corresponding to the second reference point being not earlier than a time point corresponding to the first reference point in the period of the reference frame.

Figure 10:
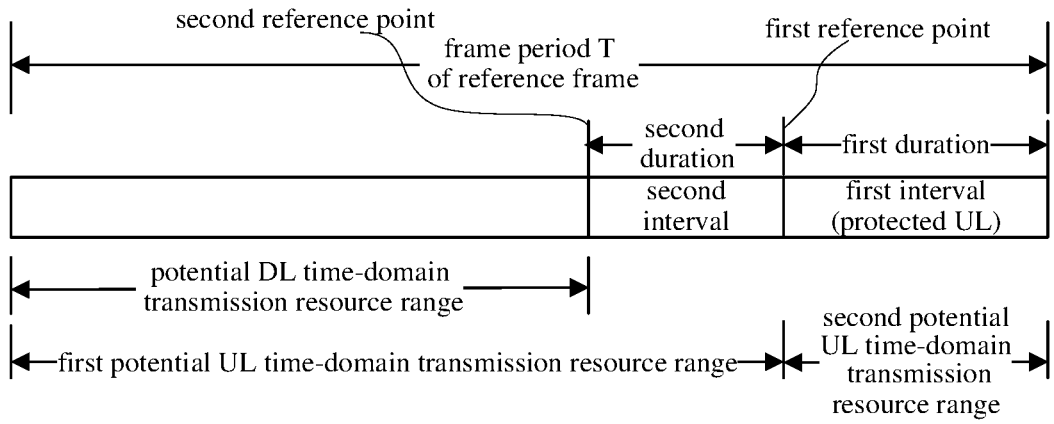
FIG. 10 is a schematic view showing a configuration of reference frame structure.

Here, the predefined boundary may be an end boundary or a start boundary of the period of the reference frame, or any other reference position in the period of the reference frame. When the predefined boundary is a right boundary of the reference frame period, FIG. 10 shows a relationship between the first duration and the first reference point as well as the configuration of reference frame structure.

In a possible embodiment of the present disclosure, the base station may determine a time-domain indication unit of each of the period of the reference frame, the first duration and the second duration in accordance with at least one of the predefined rule, the network management configuration and the inter-base station configuration signaling.

Here, the time-domain indication unit of each of the period of the reference frame, the first duration and the second duration may include an absolute time-domain indication unit (e.g., second, millisecond or microsecond) and/or the number of reference OFDM symbols.

When the time-domain indication unit is the number of the reference OFDM symbols, the base station may directly indicate a time length of the reference OFDM symbol in accordance with at least one of the predefined rule, the static configuration through the network management entity and the inter-base station configuration signaling, or indirectly indicate a Subcarrier Spacing (SCS) of the reference OFDM symbol and a Cyclic Prefix (CP) type of the reference OFDM symbol and then deduce the time length of the reference OFDM symbol.

In a possible embodiment of the present disclosure, when the configuration of reference frame structure is determined by the base station in accordance with at least one of the network management configuration and the inter-base station signaling indication, the base station may receive fourth indication information, and the fourth indication information may include a first transmission switching period and a first upper limit of transmission resources for downlink transmission in the first transmission switching period.

A second transmission switching period configured by a target cell for the mobile communication terminal may be the same as the first transmission switching period, and the location of available downlink transmission resources in the second transmission switching period may be less than or equal to the first upper limit.

The configuration of reference frame structure may be determined by the base station in accordance with the fourth indication information through at least one of: determining, by the base station, the period of the reference frame in accordance with the first transmission switching period; and determining, by the base station, the second reference point in accordance with the first upper limit.

In a possible embodiment of the present disclosure, the configuration of reference frame structure may be determined through at least one of: determining, by the base station, that the period of the reference frame is equal to the first transmission switching period; determining, by the base station, a maximum available downlink transmission resource set in the first transmission switching period in accordance with the first upper limit; and determining, by the base station, that a start time point of the second reference point is equal to an end time point of a last downlink transmission resource in the maximum available downlink transmission resource set.

In another possible embodiment of the present disclosure, when determining, by the base station, the downlink time-domain transmission resource configuration used when the base station communicates with the UE served by the base station in accordance with the configuration of reference frame structure, an end time point of the downlink time-domain transmission resource may not exceed the second reference point.

In a possible embodiment of the present disclosure, when a first interference event has been detected by the base station on an uplink OFDM symbol within a time interval from the first reference point to a right boundary of the period of the reference frame, at least one of the following procedures may be performed by the base station: transmitting, by the base station, first signaling to the network management entity to report the first interference event; or transmitting, by the base station, a first reference signal.

To be specific, when the base station has detected the first interference event in the uplink OFDM symbol within the first duration, there may exist the following two options for the base station.

Option 1: the base station may transmit the first signaling to the network management entity so as to report the first interference event to the network management entity (corresponding Step 2 in FIG. 1). After the base station has reported the first interference event to the network management entity, the base station may wait for an instruction for a next operation from the network management entity, i.e., the network management entity may take over the subsequent processings.

Figure 16:
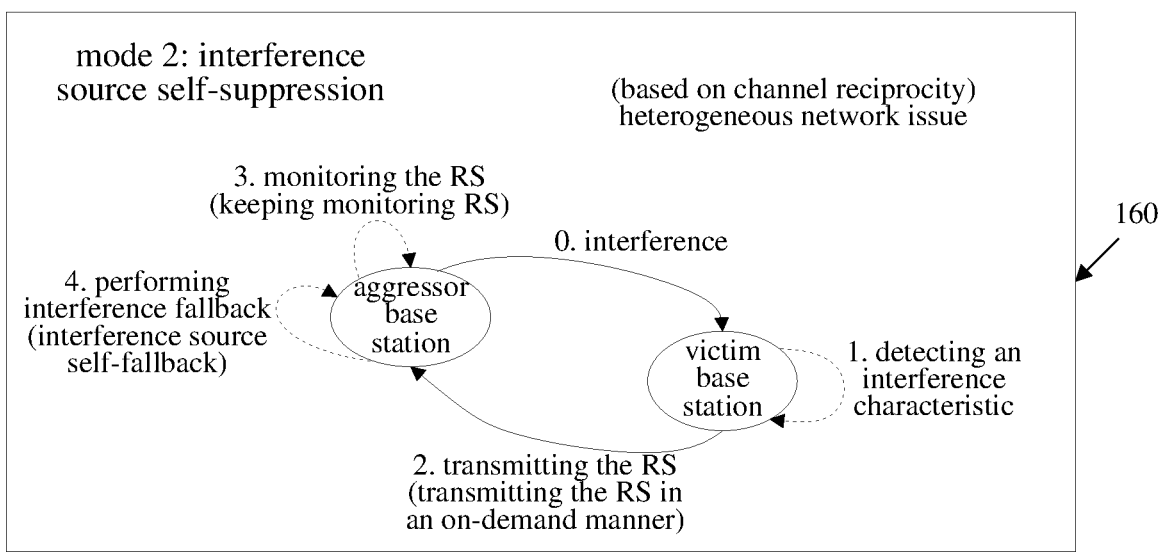
FIG. 16 is a schematic view showing a remote base station interference management process based on an interference self-suppression operating mode.

Option 2: the base station may trigger the subsequent processings on its own initiative, e.g., transmit the first reference signal on its own initiative (corresponding to Step 2 in FIG. 16). In Option 2, the network management entity does not need to participate in the processings.

Here, the first duration, i.e., a first interval in the drawings, may be a time interval from the first reference point to the right boundary of the period of the reference frame, as shown in FIG. 10.

When a first base station selects to perform the uplink transmission within the first interval, an uplink transmission behavior will be protected by a remote base station interference management mechanism. In other words, once the first base station has detected a suspected potential remote interference phenomenon (the interference comes from a far away base station) within the first interval, it may trigger a remote base station interference management event. The other base stations may respond to this event cooperatively, and an aggressor base station may perform corresponding processings, so as to reduce the remote interference on the first base station.

However, when the first base station selects to perform the uplink transmission with a time interval other than the first interval, the uplink transmission behavior will not be protected by the remote base station interference management mechanism any more.

Hence, the first base station may flexible determine time-domain positions of its own downlink transmission resources and uplink transmission resources. However, in order to support the remote base station interference management mechanism, a maximum transmission duration of the downlink transmission resource may be defined by the first base station, i.e., the downlink transmission resource may not exceed the second reference point at most.

Different from the downlink transmission, the time-domain position of the uplink transmission resource may be limited in the remote base station management mechanism to a relatively small extent, i.e., the first base station is allowed to perform the uplink transmission at any time point within the first period. However, the remote base station management mechanism has merely made a commitment to prevent the uplink transmission within the first interval from being adversely affected by the long-term remote interface. In other words, when the first base station selects to perform the uplink transmission within the first interval, the uplink transmission behavior will be protected by the remote base station interference management mechanism, and when the first base station selects to perform the uplink transmission within the time interval other than the first interval, the uplink transmission behavior will not be protected by the remote base station interference management mechanism any more, and the first base station needs to take the risk by itself.

In the embodiments of the present disclosure, the base station may periodically detect the first interference event, i.e., the detection and reporting of the first interference event may be repeated periodically without preconditions.

In other words, the base station may periodically and continuously detect the first interference event, and when the first interference event has been detected, continuously report the first interference event. For the base station, the detection and reporting of the first interference event at a subsequent time point t2 may not be adversely affected by the detection and report of the first interference event at a previous time point t1.

In the embodiments of the present disclosure, the first signaling may include at least one of an identifier of the base station, a maximum interference intensity, a maximum interference intensity offset, a maximum interference level, a third duration and at least one type of fourth duration.

The maximum interference intensity=the maximum interference intensity offset+a reference value for maximum interference intensity, the third duration may be a maximum value of a distance from each of detection points where a respective interference intensity value is greater than a first threshold to the first reference point, and the at least one fourth duration may be a maximum value of a distance from each of detection points where the respective interference intensity value is greater than at least one second threshold to the first reference point.

Figure 12:
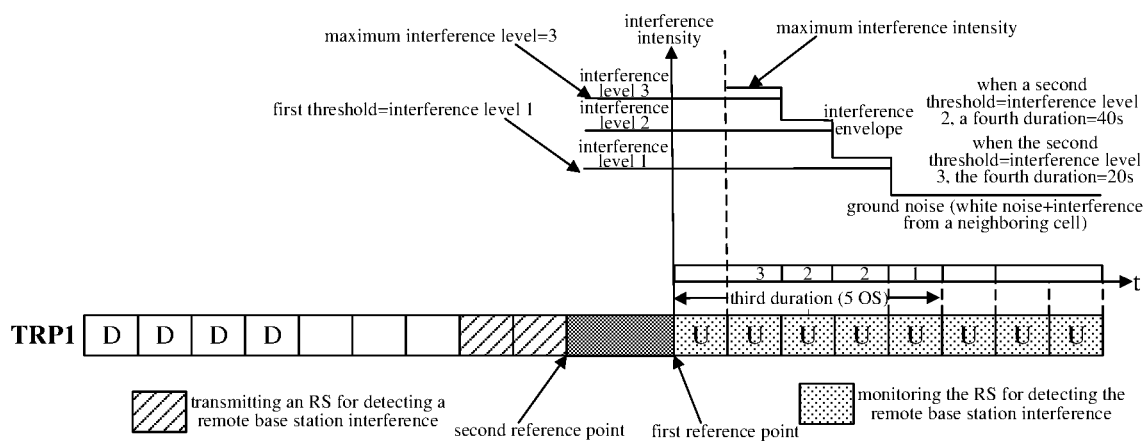
FIG. 12 is a schematic view showing the feature of a first interference event.

FIG. 12 shows the maximum interference intensity, the maximum interference level, the third duration and the at least one type of fourth duration.

As shown in FIG. 12, the maximum interference level is 3. When the first threshold=an interference level 1, the third duration may be 5 OSs; when the second threshold=an interference level 2, the third duration may be 4 OSs; and when the second threshold=an interference level 3, the third duration may be 2 OSs.

In a possible embodiment of the present disclosure, when the first signaling includes the maximum interference intensity, the base station may determine a unit of the maximum interference intensity in accordance with at least one of the predefined rule, the network management configuration, and the inter-base station signaling indication; or when the first signaling includes the maximum interference intensity offset, the base station may determine the reference value for maximum interference intensity and a unit of the maximum interference intensity offset in accordance with at least one of the predefined rule, the network management configuration, and the inter-base station signaling indication; or when the first signaling includes the maximum interference level, the base station may determine an interference level set consisting at least one interference level in accordance with at least one of the predefined rule, the network management configuration, and the inter-base station configuration signaling; or when the first signaling includes the third duration, the base station may determine the first threshold and a unit of the third duration in accordance with at least one of the predefined rule, the network management configuration, and the inter-base station configuration signaling, and the unit of the third duration may be the absolute time-domain indication unit (e.g., second, millisecond or microsecond) and/or the number of reference OFDM symbols; or when the first signaling includes at least one type of fourth duration, the base station may determine the at least one second threshold and a unit of the fourth duration in accordance with at least one of the predefined rule, the network management configuration, and the inter-base station signaling indication, and the unit of the fourth duration may be the absolute time-domain indication unit (e.g., second, millisecond or microsecond) and/or the number of reference OFDM symbols.

In a possible embodiment of the present disclosure, the base station may receive an indication for indicating the base station to transmit the first reference signal from the network management entity, and the indication may be transmitted by the network management entity upon the receipt of the first interference event from the base station. The base station may transmit the first reference signal in accordance with the indication from the network management entity. Upon the receipt of the first interference event from the base station, the network management entity may also indicate at least one of the other base stations to monitor the first reference signal.

The first interference event may be an event where a strong interference has been detected by the base station on the uplink OFDM symbol within the first interval and the interference characteristic is in line with such a tendency that an interference intensity envelope gradually decreases along with an increase in a distance from the GP (corresponding to Steps 3 and 4 in FIG. 1). FIG. 12 further shows a feature of the first interference event.

To be specific, upon the receipt of the first interference event reported by the first base station, the network management entity may take various factors into consideration, e.g., the interference characteristic reported by the first base station, the interference characteristic reported by a base station neighboring the first base station, and the number of remaining available orthogonal reference signals, so as to determine whether the first reference signal is to be transmitted by the first base station.

For example, when the network management entity finds that the number of the remaining available orthogonal reference signals is insufficient, the first interference event is also reported by at least one third base station geographically close to the first base station, and a second reference signal is currently being transmitted by the at least one third base station, the network management entity may probably decide temporarily not to allocate the first reference signal to the first base station.

The network management entity may wait until the remote base station interference management procedure of the at least one third base station takes effect. Because the first base station is geographically close to the at least one third base station, an interference source of the at least one third base station may probably be just an interference source of the first base station.

When the remote base station interference management process of the at least one third base station takes effect, the remote interference on the first base station may probably be eliminated consequently. At this time, the first base station may not be configured by the network management entity to transmit the first reference signal any more, and the remote base station interference management procedure of the first base station may be terminated.

Otherwise, when the remote base station interference management procedure of the at least one third base station has been terminated, the at least one third base station may still report the first interference event, and it means that the remote interference on the third base station is still not be eliminated. At this time, the first base station may be configured by the network management entity to transmit the first reference signal.

After the network management entity has indicated the first base station to transmit the first reference signal, the network management entity may further indicate the at least one second base station to monitor the first reference signal.

When the first base station determines that the first reference signal needs to be transmitted, the first reference signal may be transmitted by the first base station within a time interval [the second reference point–a fifth duration, the second reference point], and the fifth duration may be a time-domain length of the first reference signal.

Prior to transmitting, by the first base station, the first reference signal, the information transmission method may further include receiving, by the first base station, an indication from the network management entity, and determining, by the base station, that the first reference signal is to be transmitted.

Figure 13:
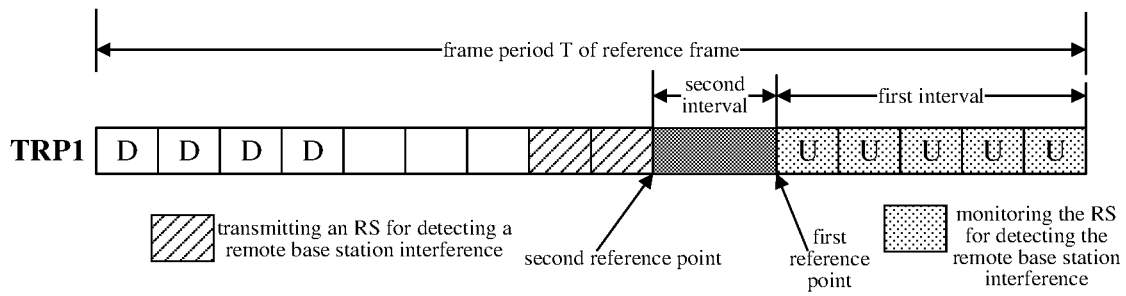
FIG. 13 is a schematic view showing time-domain resource positions for transmitting/receiving the reference signal for detecting the remote base station interference.

As shown in FIG. 13, at the time-domain resource positions for transmitting/receiving the reference signal for detecting the remote base station interference, when the first base station selects to transmit the first signaling to the network management entity to report the first interference event, the first base station may determine that the first reference signal is to be transmitted in accordance with the indication from the network management entity (corresponding to Steps 3 and 5 in FIG. 1).

Otherwise, the first base station may determine whether to transmit the first reference signal on its own initiative (corresponding to Step 2 in FIG. 16). The first reference signal may be used to detect the remote interference phenomenon, where the interference comes from a far away base station.

In a possible embodiment of the present disclosure, prior to determining, by the base station, that the first reference signal is to be transmitted, the information transmission method may further includes adjusting, by the base station, the frame structure adopted when the base station communicates with the UE served by the base station in an on-demand manner, so as to at least ensure that a time-domain transmission resource for transmitting the first reference signal is not used to receive uplink data for the UE served by the base station.

In a possible embodiment of the present disclosure, the fifth duration may be determined by the base station in accordance with the predefined rule; or the base station receives the fifth indication information and determines the fifth duration, wherein the fifth indication information may be carried in at least one of the network management configuration or the inter-base station configuration signaling.

A time-domain indication unit of the fifth duration may include an absolute time-domain indication unit (e.g., second, millisecond or microsecond) and/or the number of reference OFDM symbols.

In a possible embodiment of the present disclosure, when the base station determines that the first reference signal is to be monitored, the first reference signal may be monitored by the base station from the first reference point. To be specific, the first reference signal may be monitored by the base station within a sixth duration from the first reference point.

A time-domain indication unit of the sixth duration may include an absolute time-domain indication unit (e.g., second, millisecond or microsecond) and/or the number of reference OFDM symbols.

In a possible embodiment of the present disclosure, the sixth duration may be determined by the base station through the predefined rule; or the base station may receive the sixth indication information and determine the sixth duration, wherein the sixth indication information may be carried in at least one of the network management configuration or the inter-base station signaling.

In a possible embodiment of the present disclosure, the first reference signal may be monitored by the other base station within a consecutive or nonconsecutive monitoring window consisting of a period of at least one reference frame in accordance with an indication from the network management entity (corresponding to Steps 4 and 6 in FIG. 1), or the first reference signal may be monitored by the other base station repeatedly in accordance with a predetermined period configuration (corresponding to Step 3 in FIG. 16).

Figure 11:
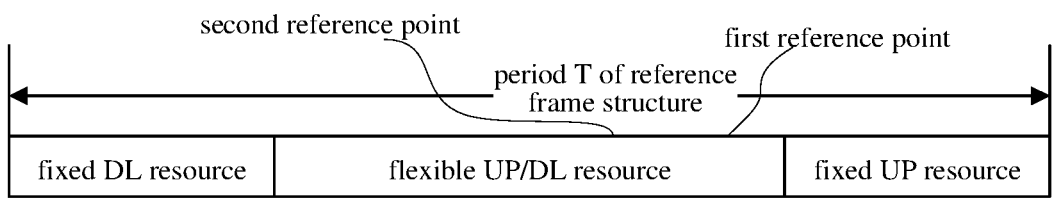
FIG. 11 is a schematic view showing the combination of the semi-static frame structure and reference frame structure for remote base station interference management.

As shown in FIG. 11, when the period of the reference frame is configured to be equal to the period of the semi-static frame structure, a time-domain position of the first reference point may be configured to be less than or equal to a left boundary of a fixed uplink transmission resource in the semi-static frame structure.

The time interval t3 from the second reference point to the first reference point may be at least greater than or equal to t1, or at least greater than or equal to t2, where t1 represents a switching time from a minimum downlink transmission resource to an uplink transmission resource for all base stations in a network, and t2 represents a duration of a minimum GP for all the base stations in the network.

Figure 7:
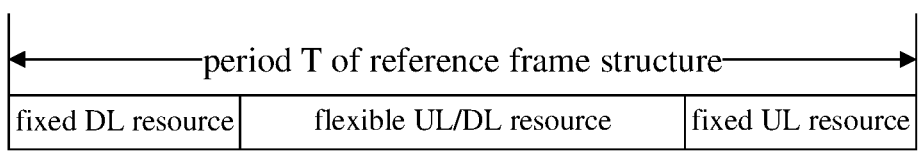
FIG. 7 is a schematic view showing a semi-static frame structure.

In the embodiments of the present disclosure, the above-mentioned configuration of reference frame structure may be used in combination with the semi-static frame structure in FIG. 7. As an appropriate configuration, the first period may be equal to a period of the semi-static frame structure, and the time-domain position of the first reference point may be less than or equal to the left boundary of the fixed uplink transmission resource in the semi-static frame structure.

In addition, the time interval t3 from the second reference point to the first reference point may be determined in accordance with the switching time t1 from the minimum downlink transmission resource to the uplink transmission resource for all base stations in the network as well as the minimum duration t2 of the GPs for all the base stations in the network. Obviously, t2>=t1. As a principle for determining t3, t3 may be at least greater than or equal to t1. Preferably, t3 may be configured to be greater than or equal to t2, so as to improve the network utilization rate.

A remote interference management enhancement mechanism in the heterogeneous network of the present disclosure will be described hereinafter in conjunction with FIGS. 14, 15 and 16.

FIG. 16 shows the remote base station interference management procedure based on an interference self-suppression operating mode 160.

Step 0: the downlink data for the aggressor base station may interfere with the uplink data reception behavior of the victim base station.

Step 1: the victim base station may detect the interference characteristic of the interference on the uplink data, and determine that there is remote base station interference on the victim base station.

Step 2: the victim base station may transmit the second reference signal, so that the second reference signal is capable of being detected by the other base stations (including the aggressor base station). It should be appreciated that, the transmission of the second reference signal is conditional, i.e., the second reference signal may be transmitted merely when it is determined by the victim base station that there is the remote interference on the victim base station itself.

Step 3: the aggressor base station may monitor the second reference signal. It should be appreciated that, the monitoring of the second reference signal by the aggressor base station is unconditional, i.e., the aggressor base station may try to monitor the second reference signal all the time.

Step 4: after the second reference signal has been detected by the aggressor base station, the aggressor base station may determine whether to perform an interference fallback operation on the basis of its own independent decision.

Figure 8:
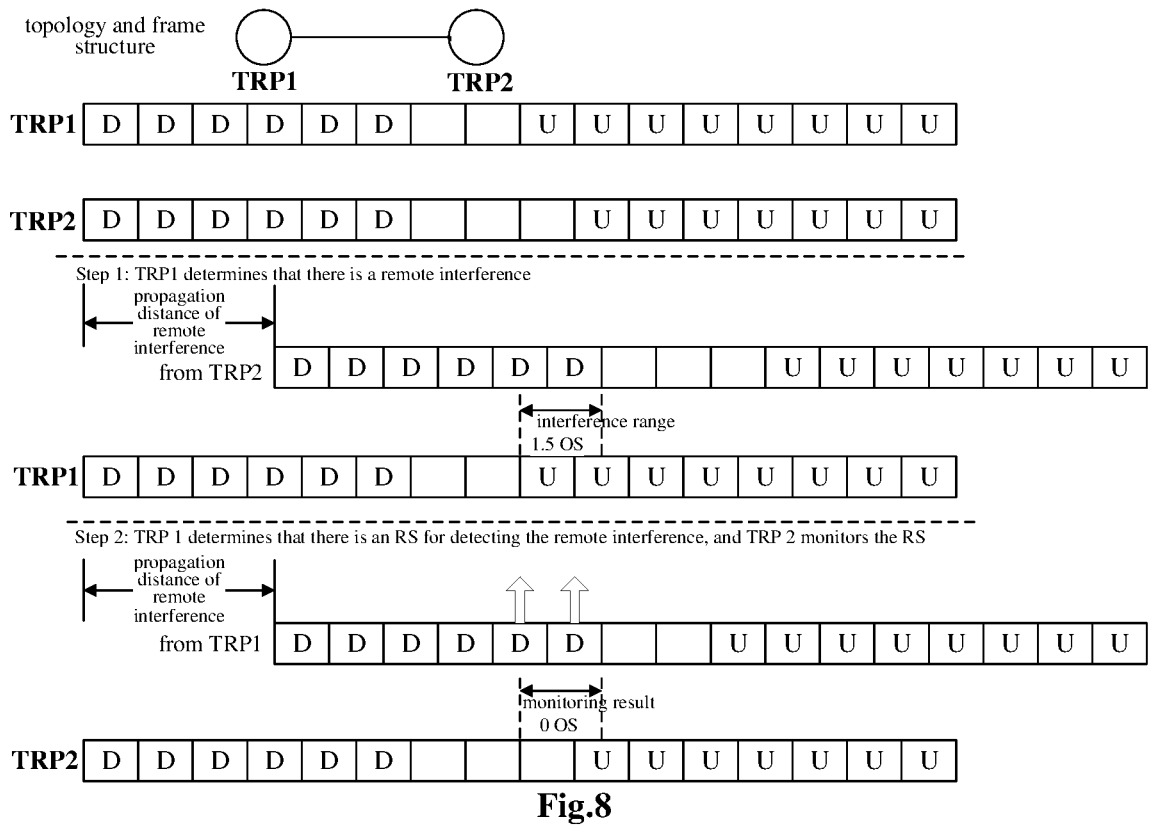
FIG. 8 is a schematic view showing a heterogeneous network type 1 with aligned DLs and different GP lengths resulting in unaligned ULs.
Figure 14:
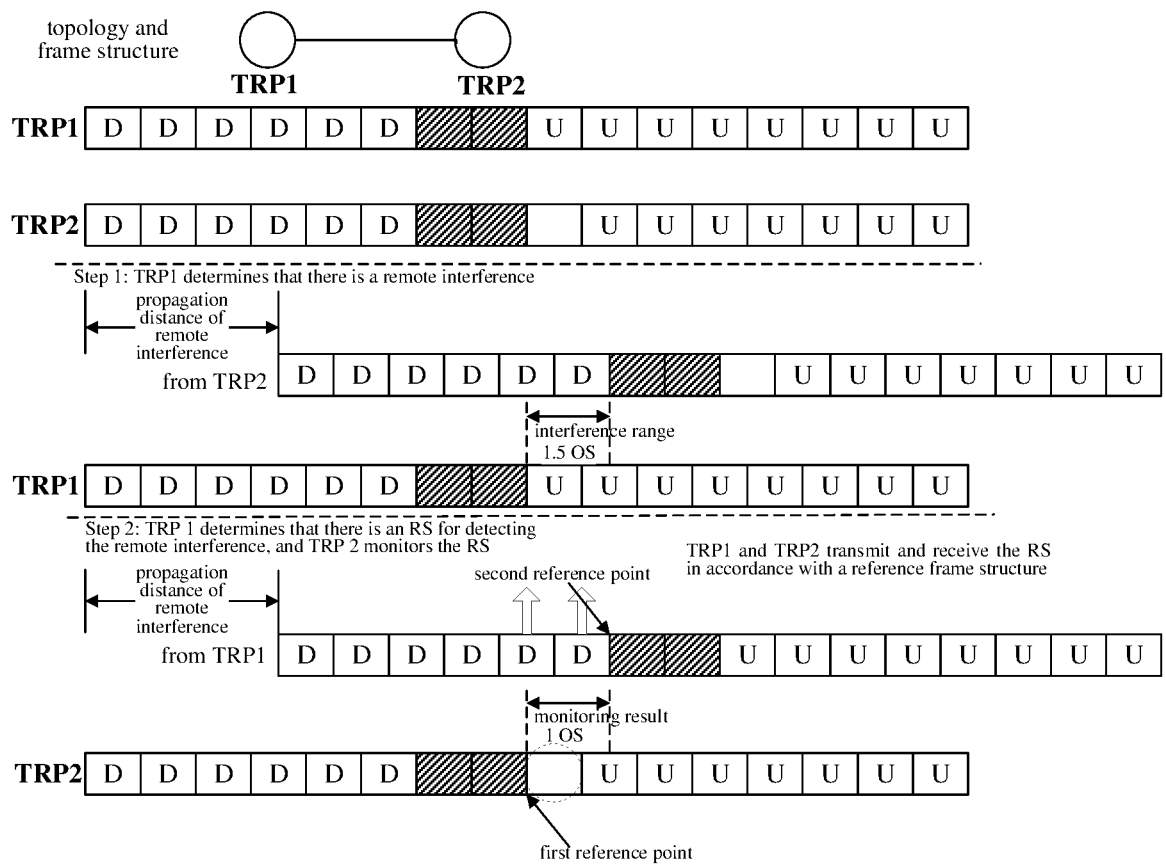
FIG. 14 is a schematic view showing a heterogeneous network type 1 with aligned DLs and different GP lengths resulting in unaligned ULs according to an embodiment of the present disclosure.

In the scheme as shown in FIG. 8, the remote base station interference management mechanism may fail, but in the enhancement scheme in FIG. 14, the remote base station interference management mechanism may still work normally.

As shown in FIG. 14, the DL of the TRP 1 is aligned with the DL of the TRP 2, the GPs of the TRP 1 and the TRP 2 have different lengths, so the UL of the TRP 1 is not aligned with the UL of the TRP 2.

As shown in FIG. 14, in Step 1, the TRP 1 may determine that there is the remote interference (corresponding to Step 1 in the flowchart).

As shown in FIG. 14, in Step 2, the TRP 1 may transmit the RS for detecting the remote base station interference (i.e., the first RS) on two downlink OFDM symbols before the second reference point in accordance with the configuration of reference frame structure (corresponding Step 5 in the flowchart), and the TRP 2 may monitor the first RS on at least one uplink OFDM symbol after the first reference point in accordance with the configuration of reference frame structure (corresponding to Step 6 in the flowchart).

Although in the heterogeneous network, the remote base station interference management mechanism may operate normally because the same configuration of reference frame structure is used by the TRP 1 and the TRP 2 during the reception/transmission of the first RS.

Figure 9:
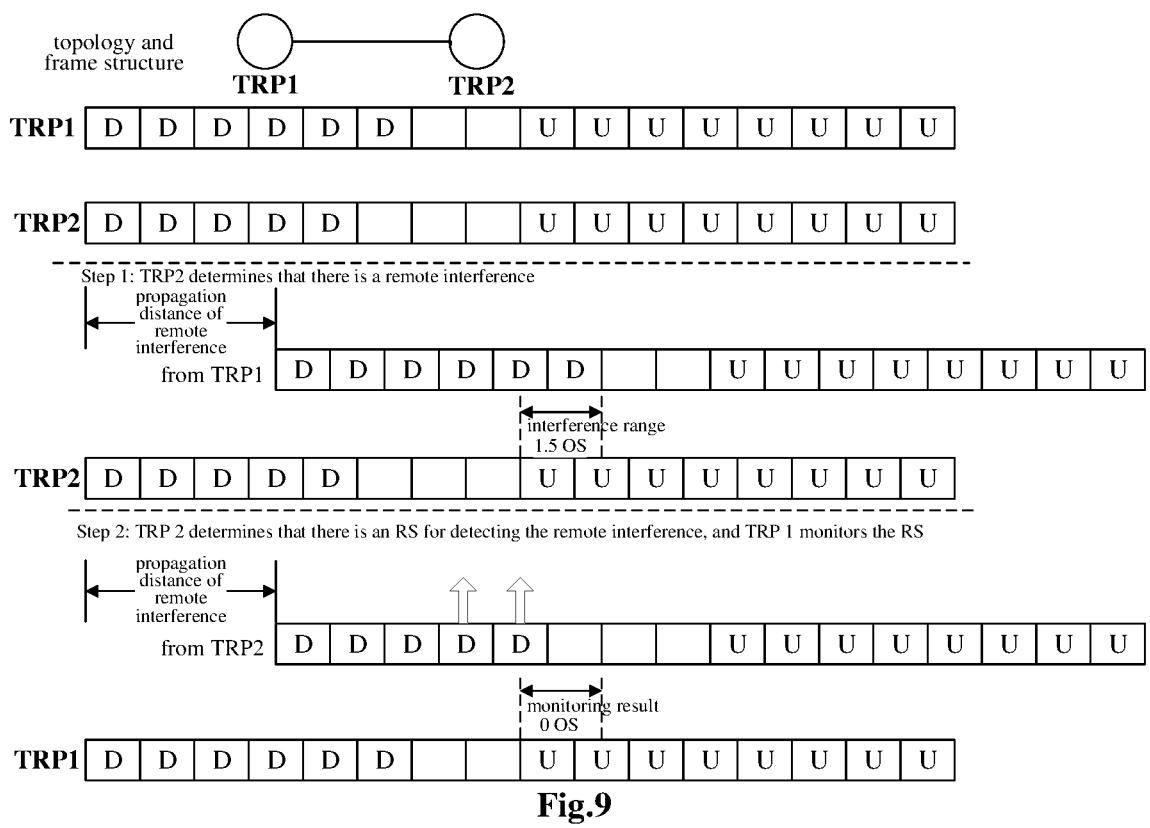
FIG. 9 is a schematic view showing a heterogeneous network type 2 with aligned ULs and different GP lengths resulting in unaligned DLs.
Figure 15:
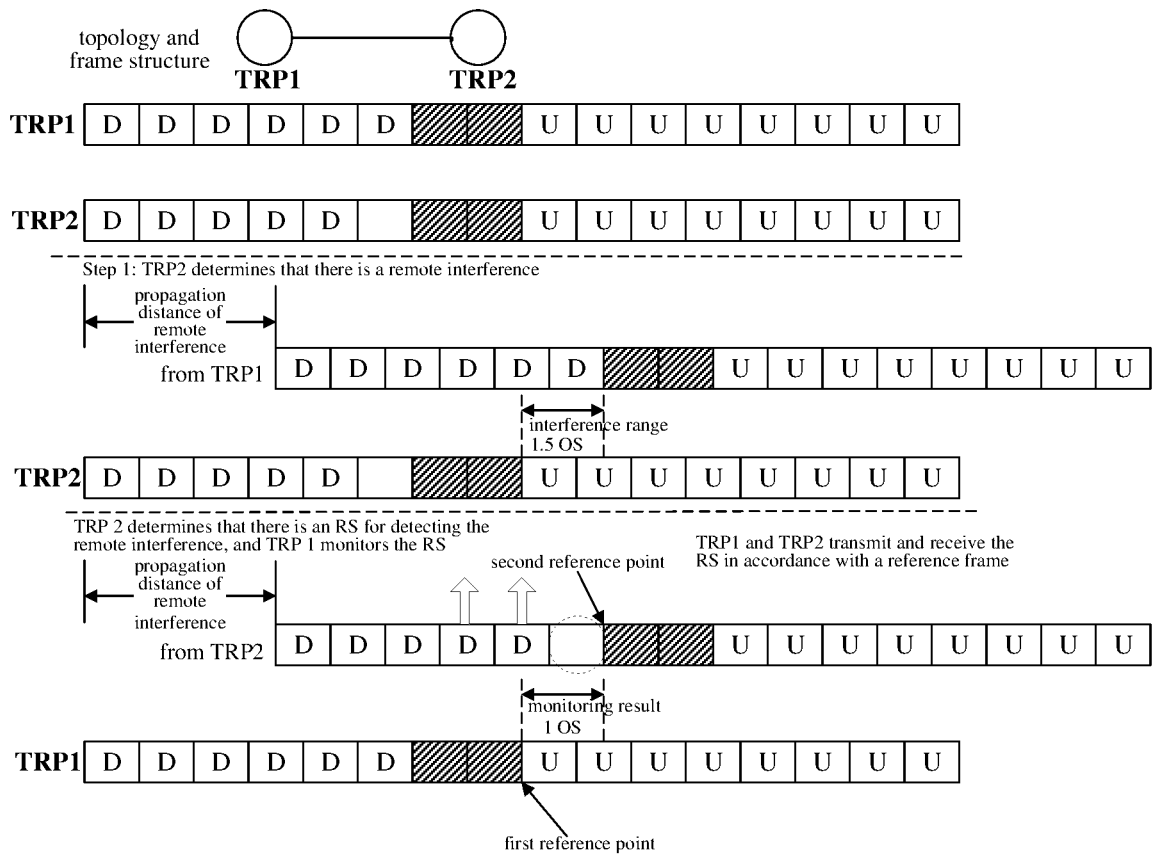
FIG. 15 is a schematic view showing a heterogeneous network type 2 with aligned ULs and different GP lengths resulting in unaligned DLs.

In a comparative scheme as shown in FIG. 9, the remote base station interference management mechanism may fail, but in the enhancement scheme as shown in FIG. 15, the remote base station interference management mechanism may still operate normally.

As shown in FIG. 15, the UL of the TRP 1 is aligned with the UL of the TRP 2, the GPs of the TRP 1 and the TRP 2 have different lengths, so the DL of the TRP 1 is not aligned with the DL of the TRP 2.

As shown in FIG. 15, in Step 1, the TRP 2 may determine that there is the remote interference (corresponding to Step 1 in the flowchart).

As shown in FIG. 15, in Step 2, the TRP 2 may transmit the RS for detecting the remote base station interference (i.e., the first RS) on two downlink OFDM symbols before the second reference point in accordance with the configuration of reference frame structure (corresponding Step 5 in the flowchart), and the TRP 1 may monitor the first RS on at least one uplink OFDM symbol after the first reference point in accordance with the configuration of reference frame structure (corresponding to Step 6 in the flowchart).

Although in the heterogeneous network, the remote base station interference management mechanism may operate normally because the same configuration of reference frame structure is used by the TRP 1 and the TRP 2 during the reception/transmission of the first RS.

In the embodiments of the present disclosure, the first base station and/or the second base station may determine at least one time variable of the period of the reference frame, the first duration, the second duration, the fifth duration and the sixth duration in accordance with at least one of the predefined rule, the network management configuration and the inter-base station configuration signaling. The at least one time variable may be indicated through at least one time variable indication method including an absolute time, the number of reference OFDM symbols, the number of reference slots and/or the number of reference mini-slots. When the time variable indication includes the number of the reference OFDM symbols, the first base station and/or the second base station may indicate an SCS of the reference OFDM symbol and a CP type of the reference OFDM symbol in accordance with at least one of the predefined rule, the network management configuration and the inter-base station configuration signaling.

According to the embodiments of the present disclosure, in the case of transmitting and receiving the reference signal for detecting the remote base station interference, it is able to homogenize a heterogeneous network. Through defining the reference frame structure independent of a real frame structure for each base station, it is able for each base station to transmit/receive the reference signal for detecting the remote base station interference according to the reference frame structure configuration, thereby to effectively prevent the remote base station interference management process from being adversely affected by the heterogenization of the base stations.

The present disclosure further provides in some embodiments a base station, which includes a transceiver used to transmit and/or receive a reference signal in accordance with a configuration of reference frame structure, and/or determine an uplink and/or downlink time-domain transmission resource configuration in accordance with the configuration of reference frame structure, wherein the uplink and/or downlink time-domain transmission resource configuration is used when the base station communicates with a UE served by the base station, and the configuration of reference frame structure includes a period of a reference frame, and at least one of a first reference point and a second reference point in the period of the reference frame.

It should be appreciated that, the base station may be any base station in a heterogeneous network system. The implementation of the base station may refer to that of the method in FIGS. 10 to 15 with a same technical effect.

The present disclosure further provides in some embodiments an information transmission method for a network management entity, which includes configuring a reference frame structure for at least one first base station and/or second base station. The configuration of reference frame structure includes a period of a reference frame, and at least one of a first reference point and a second reference point in the period of the reference frame.

Here, the first base station and the second base station may be used to describe the base stations having two different behaviors or playing two different roles in a communication link. In a single communication link, the first base station and the second base station may be physically different from each other. However, for a certain physical base station, it may serve as the first base station in one communication link and serve as the second base station in another communication link.

In a possible embodiment of the present disclosure, the information transmission method may further include: receiving a first interference event reported by the at least one first base station; transmitting, to the at least one first base station, indication information for indicating the first base station to transmit a first reference signal.

In a possible embodiment of the present disclosure, the information transmission method may further include: transmitting, to the at least one second base station, indication information for indicating the second base station to monitor the first reference signal, to enable the second base station to monitor the first reference signal within a consecutive or non-consecutive monitoring window consisting of a period of at least one reference frame, or enable the second base station to monitor the first reference signal repeatedly in accordance with a predetermined period configuration.

In a possible embodiment of the present disclosure, when the period of the reference frame is equal to a period of a semi-static frame structure, a time-domain position of the first reference point is configured to be less than or equal to a left boundary of a fixed uplink transmission resource in the semi-static frame structure.

In a possible embodiment of the present disclosure, when configuring the first reference point and the second reference point, a time interval t3 from the second reference point to the first reference point may be at least greater than or equal to t1, or at least greater than or equal to t2, t1 represents a switching time from a minimum downlink transmission resource to an uplink transmission resource for all base stations in a network, and t2 represents a duration of a minimum GP for all the base stations in the network.

Correspondingly, the present disclosure further provides in some embodiments a network management entity, which includes a processor configured to configure a reference frame structure for at least one first base station and/or second base station. The configuration of reference frame structure may include a period of a reference frame, and at least one of a first reference point and a second reference point in the period of the reference frame.

The network management entity is a device corresponding to the above-mentioned method, and the implementation of the network management entity may refer to that of the method with a same technical effect.

The present disclosure further provides in some embodiments a communication device, which includes a processor, and a memory storing therein a computer program. The processor is used to execute the computer program, so as to implement the above-mentioned methods. The processor may be connected to the memory via a bus or an interface. The communication device may be a network device, e.g., a base station, or a network management entity.

The present disclosure further provides in some embodiments a computer-readable storage medium storing therein an instruction. The instruction is executed by a computer so as to implement the above-mentioned methods.

It should be appreciated that, units and algorithm steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted by a technician with respect to the respective specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the disclosed device and method may be implemented in any other ways. For example, the embodiments for the devices are merely for illustrative purposes, and the units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The elements shown as units may be, or may not be, physical units, i.e., they may be arranged at an identical position, or distributed on a plurality of network units. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the prior art, may appear in the form of software products, which may be stored in a storage medium and include instructions so as to enable computer equipment (e.g., a personal computer, a server or network equipment) to execute all or parts of the steps of the method according to the embodiments of the present disclosure. The storage medium includes any medium capable of storing therein program codes, e.g., a Universal Serial Bus (USB) flash disk, a mobile Hard Disk (HD), a Read-Only Memory (ROM), a Random Access Memory (RAM), a magnetic disk or an optical disk.

It should be appreciated that, relevant hardware may be controlled through a computer program so as to implement all of or parts of the steps in the methods, and the computer program may be stored in a computer-readable storage medium. The computer program is executed so as to implement the steps in the above-mentioned methods. The computer-readable storage medium may be a magnetic disk, an optical disk, an ROM or an RAM.

The above are merely preferred embodiments of the present disclosure. It should be appreciated that a person skilled in the art may make further modifications and improvements without departing from the principle of the present disclosure, and these modifications and improvements shall also fall within the scope of the present disclosure.

What is claimed is:

1. An information transmission method for a base station, wherein the information transmission method comprises:
   transmitting and/or receiving, by the base station, a reference signal in accordance with a configuration of reference frame structure, and/or determining, by the base station, an uplink and/or downlink time-domain transmission resource configuration in accordance with the configuration of reference frame structure, where, the uplink and/or downlink time-domain transmission resource configuration is used when the base station communicates with a User Equipment (UE) served by the base station,
   wherein, the configuration of reference frame structure comprises a period of the reference frame structure, and at least one of a first reference point and a second reference point in the period of the reference frame structure,
   wherein the configuration of the reference frame structure is determined by the base station in accordance with at least one of a predefined rule, network management configuration, and inter-base station signaling indication,
   wherein when the configuration of the reference frame structure is determined by the base station in accordance with at least one of the network management configuration and the inter-base station signaling indication, the base station receives at least one of:
      first indication information for determining the period of the reference frame structure;
      second indication information for determining the first reference point, wherein the second indication information comprises a first duration, and the time distance from the first reference point to a predefined boundary of the period of the reference frame structure is equal to the first duration; and
      third indication information for determining the second reference point, wherein the third indication information comprises a second duration, the time distance from the second reference point to the first reference point is equal to the second duration, and a time corresponding to the second reference point is not later than a time corresponding to the first reference point in the period of the reference frame structure; or
   wherein when the configuration of the reference frame structure is determined by the base station in accordance with at least one of the network management configuration and the inter-base station signaling indication, the base station receives:
      fourth indication information, wherein the fourth indication information comprises an indication for a first transmission switching period and an indication for a first upper limit of downlink transmission resources in the first transmission switching period,
      wherein the configuration of the reference frame structure is determined by the base station in accordance with the fourth indication information through at least one of:
         determining, by the base station, the period of the reference frame structure in accordance with the first transmission switching period; and
         determining, by the base station, the second reference point in accordance with the first upper limit.

2. The information transmission method according to claim 1, wherein
   the reference signal is used to detect a remote interference phenomenon, where the interference comes from a far away base station.

3. The information transmission method according to claim 1, wherein
   when the period of the reference frame structure is equal to a period of a semi-static frame structure, a time-domain position of the first reference point is less than or equal to a left boundary of a fixed uplink transmission resource in the semi-static frame structure.

4. The information transmission method according to claim 1, wherein the configuration of reference frame structure is determined through at least one of:
   determining, by the base station, that the period of the reference frame structure is equal to the first transmission switching period;
   determining, by the base station, a maximum available downlink transmission resource set in the first transmission switching period in accordance with the first upper limit; and
   determining, by the base station, that a start time point of the second reference point is equal to an end time point of the last downlink transmission resource in the maximum available downlink transmission resource set.

5. The information transmission method according to claim 1, wherein when the base station determines the downlink time-domain transmission resource configuration used when the base station communicates with the UE served by the base station in accordance with the configuration of reference frame structure, an end time point of the downlink time-domain transmission resources is not later than the second reference point.

6. The information transmission method according to claim 1, wherein when a first interference event has been detected by the base station on an uplink Orthogonal Frequency Division Multiplexing (OFDM) symbol within a time interval from the first reference point to a right boundary of the period of the reference frame structure, at least one of the following procedures is performed by the base station:
   transmitting, by the base station, a first signaling to the network management entity to report the first interference event; or
   transmitting, by the base station, a first reference signal.

7. The information transmission method according to claim 6, wherein
   the base station is periodically monitoring the first interference event.

8. The information transmission method according to claim 6, wherein the first signaling comprises at least one of: an identifier of the base station, a maximum interference intensity, a maximum interference intensity offset, a maximum interference level, a third duration and at least one fourth duration.

9. The information transmission method according to claim 1, wherein
the first reference signal is transmitted by the base station within a time interval, and the third duration is a time-domain length of the first reference signal.

10. The information transmission method according to claim 1, wherein
the first reference signal is monitored by the base station starting from the first reference point.

11. The information transmission method according to claim 10, wherein
the first reference signal is monitored by the base station within a consecutive or nonconsecutive monitoring window consisting of a period of at least one reference frame structure in accordance with an indication from the network management entity; or
the first reference signal is monitored by the base station repeatedly in accordance with a predetermined period configuration.

12. An information transmission method for a network management entity, wherein the information transmission method comprises:
configuring a reference frame structure for at least one first base station and/or second base station,
wherein the configuration of reference frame structure comprises a period of a reference frame structure, and at least one of a first reference point and a second reference point in the period of the reference frame structure,
wherein when configuring the first reference point and the second reference point, a time interval t3 from the second reference point to the first reference point is determined through that:
the time interval t3 from the second reference point to the first reference point is at least greater than or equal to t1, wherein t1 represents a minimum switching time from a downlink transmission resource to an uplink transmission resource for all base stations in a network; or
the time interval t3 from the second reference point to the first reference point is at least greater than or equal to t2, wherein t2 represents a minimum Guard Period (GP) duration for all the base stations in the network.

13. The information transmission method according to claim 12, further comprising:
receiving a first interference event reported by the at least one first base station;
transmitting, to the at least one first base station, indication information for indicating the first base station to transmit a first reference signal.

14. The information transmission method according to claim 12, further comprising:
transmitting, to the at least one second base station, indication information for indicating the second base station to monitor the first reference signal, to enable the second base station to monitor the first reference signal within a consecutive or non-consecutive monitoring window consisting of a period of at least one reference frame structure, or enable the second base station to monitor the first reference signal repeatedly in accordance with a predetermined period configuration.

15. The information transmission method according to claim 12, wherein
when the period of the reference frame structure is equal to a period of a semi-static frame structure, a time-domain position of the first reference point is configured to be less than or equal to a left boundary of a fixed uplink transmission resource in the semi-static frame structure.

16. A base station, comprising: a processor, and a memory storing therein a computer program, wherein the processor is used to execute the computer program, to implement an information transmission method comprising:
transmitting and/or receiving a reference signal in accordance with a configuration of reference frame structure, and/or determining an uplink and/or downlink time-domain transmission resource configuration in accordance with the configuration of reference frame structure, where, the uplink and/or downlink time-domain transmission resource configuration is used when the base station communicates with a UE served by the base station,
wherein, the configuration of reference frame structure comprises a period of the reference frame structure, and at least one of a first reference point and a second reference point in the period of the reference frame structure,
wherein the configuration of the reference frame structure is determined in accordance with at least one of a predefined rule, network management configuration, and inter-base station signaling indication,
wherein the processor is used to execute the computer program to: when the configuration of the reference frame structure is determined in accordance with at least one of the network management configuration and the inter-base station signaling indication, receive at least one of:
first indication information for determining the period of the reference frame structure;
second indication information for determining the first reference point, wherein the second indication information comprises a first duration, and the time distance from the first reference point to a predefined boundary of the period of the reference frame structure is equal to the first duration; and
third indication information for determining the second reference point, wherein the third indication information comprises a second duration, the time distance from the second reference point to the first reference point is equal to the second duration, and a time corresponding to the second reference point is not later than a time corresponding to the first reference point in the period of the reference frame structure; or
wherein the processor is used to execute the computer program to: when the configuration of the reference frame structure is determined in accordance with at least one of the network management configuration and the inter-base station signaling indication, the base station receives:
fourth indication information, wherein the fourth indication information comprises an indication for a first transmission switching period and an indication for a first upper limit of downlink transmission resources in the first transmission switching period,
wherein determining the configuration of the reference frame structure in accordance with the fourth indication information through at least one of:

determining the period of the reference frame structure in accordance with the first transmission switching period; and determining the second reference point in accordance with the first upper limit.

\* \* \* \* \*